US011136908B2

(12) United States Patent
McCormick

(10) Patent No.: US 11,136,908 B2
(45) Date of Patent: Oct. 5, 2021

(54) HEATED LUBRICATION CIRCUIT

(71) Applicant: HS Marston Aerospace Limited, Wolverhampton (GB)

(72) Inventor: John McCormick, Willenhall (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 575 days.

(21) Appl. No.: 15/964,415

(22) Filed: Apr. 27, 2018

(65) Prior Publication Data

US 2018/0371969 A1 Dec. 27, 2018

(30) Foreign Application Priority Data

Jun. 23, 2017 (EP) ..................... 17177567

(51) Int. Cl.

| F01M 5/00 | (2006.01) |
|---|---|
| F01D 25/18 | (2006.01) |
| F16N 39/04 | (2006.01) |
| F16H 57/04 | (2010.01) |
| F16N 39/02 | (2006.01) |
| F01D 25/10 | (2006.01) |
| F02C 7/14 | (2006.01) |
| F02C 7/06 | (2006.01) |

(Continued)

(52) U.S. Cl.
CPC ............ *F01M 5/007* (2013.01); *F01D 25/10* (2013.01); *F01D 25/18* (2013.01); *F01M 5/001* (2013.01); *F01M 5/002* (2013.01); *F02C 7/06* (2013.01); *F02C 7/14* (2013.01); *F02C 7/32* (2013.01); *F16H 57/0413* (2013.01); *F16H 57/0415* (2013.01); *F16N 39/02* (2013.01); *F16N 39/04* (2013.01); *F01M 1/02* (2013.01); *F05D 2220/76* (2013.01); *F05D 2260/213* (2013.01); *F05D 2260/4031* (2013.01); *F05D 2260/98* (2013.01); *F05D 2270/303* (2013.01); *F05D 2270/80* (2013.01); *F16N 2200/10* (2013.01);

(Continued)

(58) Field of Classification Search
CPC ........ F01M 5/007; F01M 5/001; F01M 5/002; F01D 25/10; F01D 25/18; F02C 7/06; F02C 7/14; F02C 7/32; F16H 57/0413; F16H 57/0415; F16N 39/02; F16N 39/04
See application file for complete search history.

(56) References Cited

U.S. PATENT DOCUMENTS

| 9,175,595 B2 | 11/2015 | Ceynow et al. |
| 9,273,572 B2 | 3/2016 | Neal et al. |

(Continued)

FOREIGN PATENT DOCUMENTS

| EP | 0266765 A2 | 5/1988 |
| FR | 2960592 A1 | 12/2011 |
| FR | 3011277 A1 | 4/2015 |

OTHER PUBLICATIONS

EPO Official Letter for Application No. 17177567.9, dated Mar. 26, 2020, 5 pages.

(Continued)

*Primary Examiner* — Michael R Mansen
*Assistant Examiner* — Robert T Reese
(74) *Attorney, Agent, or Firm* — Cantor Colburn LLP

(57) ABSTRACT

A lubrication circuit for a gas turbine engine comprises a heat exchanger having an inlet pipe which carries a flow of lubricant to the heat exchanger; a heater configured to heat lubricant to produce a flow of heated lubricant to be provided to the heat exchanger; and a sensor operable to measure a measured parameter from which it can be determined whether the lubricant requires heating.

12 Claims, 4 Drawing Sheets

(51) Int. Cl.
*F02C 7/32* (2006.01)
*F01M 1/02* (2006.01)
*F28F 1/00* (2006.01)

(52) U.S. Cl.
CPC ...... *F16N 2250/08* (2013.01); *F16N 2250/36* (2013.01); *F28F 1/00* (2013.01)

(56) References Cited

U.S. PATENT DOCUMENTS

| | | |
|---|---|---|
| 9,416,696 B2 | 8/2016 | Cattani et al. |
| 2005/0072385 A1* | 4/2005 | Kanno .................. F01P 7/165 123/41.1 |
| 2009/0191060 A1 | 7/2009 | Bagepalli et al. |
| 2009/0200114 A1 | 8/2009 | Bagepalli et al. |
| 2012/0285413 A1* | 11/2012 | Pingen .................. F01M 5/001 123/196 AB |
| 2013/0336764 A1* | 12/2013 | Schmidt ................. F01D 25/18 415/110 |
| 2014/0223917 A1 | 8/2014 | Gameiro et al. |
| 2015/0211395 A1* | 7/2015 | Gooden ................. F01M 5/007 165/280 |
| 2016/0003148 A1 | 1/2016 | Gameiro et al. |
| 2016/0333783 A1 | 11/2016 | Weiner |
| 2016/0348548 A1 | 12/2016 | Borghese et al. |
| 2019/0284973 A1* | 9/2019 | Kim ........................ F01M 5/02 |

OTHER PUBLICATIONS

Extended European Search Report for International Application No. 17177567.9 dated Dec. 1, 2017, 7 pages.

\* cited by examiner

HEATED LUBRICATION CIRCUIT

FOREIGN PRIORITY

This application claims priority to European Patent Application No. 17177567.9 filed Jun. 23, 2017, the entire contents of which is incorporated herein by reference.

TECHNICAL FIELD

The present disclosure relates to a lubrication circuit, for example a lubrication circuit which lubricates a gearbox, particularly in a gas turbine engine of an aircraft. The lubrication circuit comprises a heater for heating cold congealed/solidified lubricant.

BACKGROUND

In certain lubrication circuits which lubricate a mechanical system, the lubricant may become very hot whilst passing through the circuit. The lubricant may therefore be passed through a heat exchanger within the lubrication circuit in order to cool the lubricant. This prevents the lubricant from reaching a temperature where it can begin to break down; the lubricant becoming too hot has a negative impact on its lubricating properties.

Prior to the lubricated system starting up (i.e. when the system is cold), in cold ambient temperatures the lubricant may also be cold. Depending on the ambient temperature, the lubricant may have solidified, or at least may be congealed and highly viscous. On starting up the system, the lubricant may be pumped round the circuit, but the presence of the congealed/solid lubricant is detrimental to the operation and performance of the lubricated system. Moreover, pumping congealed/solid lubricant may produce high pressures in the lubricant circuit and can cause damage to components within the lubrication circuit, for example the heat exchanger. To protect the heat exchanger, the lubricant may be passed through a bypass gallery which circumvents the heat exchanger matrix. The bypass gallery may comprise a pressure relief valve which allows the cold lubricant to pass through when the pressure of the pumped lubricant is above the threshold value. The bypass gallery also protects the pump. The pump has to work much harder to pump the solid oil around the system than if the oil is free flowing. The bypass gallery prevents an excessive pressure drop in the system, which might otherwise occur in a system without the bypass gallery when the lubricant is congealed/solid, and which would result in system starvation (i.e. depriving the system of lubricant).

An improved lubricant circuit, which for example may reduce the wear on the pressure relief valve by reducing the frequency with which the pressure relief valve is actuated, is sought.

SUMMARY

The present disclosure can be seen to provide a lubrication circuit for a gas turbine engine comprising: a heat exchanger; an inlet pipe which carries lubricant to the heat exchanger; a heater configured to heat the lubricant in the inlet pipe prior to its introduction to the heat exchanger; and a sensor operable to measure a parameter from which it can be determined whether the lubricant requires heating.

The lubricant may require heating when it is congealed/solid. Such an arrangement may heat the lubricant upstream of the heat exchanger, such that the lubricant is liquefied prior to flowing into the heat exchanger.

The feature that the heater heats the lubricant in the inlet pipe prior to its introduction to the heat exchanger means that the heater heats the lubricant just upstream of the heat exchanger, such that no other components are positioned in the lubrication circuit between the location of the heater and the heat exchanger (other than an optional section of the inlet pipe downstream of the location of the heater, prior to an inlet of the heat exchanger).

The heat exchanger may comprise a bypass gallery having a pressure relief valve which allows lubricant to flow into the bypass gallery, circumventing the heat exchanger matrix, if the pressure is above a predetermined value.

By virtue of the provision of the heater, there may be no need to flow congealed/solid lubricant into the bypass gallery, so that the pressure relief valve is actuated less frequently, and so the life of the pressure relief valve may be prolonged.

The bypass gallery may be retained in the circuit, since congealed/solid lubricant is not the only potential source of high pressure in the system. The lubricant flow may comprise solid particles (for example, debris) which cannot be eliminated by heating. If such particles pass into the heat exchanger, the heat exchanger matrix may become blocked, causing the pressure in the circuit to rise. To protect the heat exchanger, the lubricant flow may then be directed through the bypass gallery.

The heater may be an electrical heater. For example, the heater may comprise a resistive wire in contact with the inlet pipe. The heater may comprise a coil of resistive wire wound around the inlet pipe.

The resistivity of the wire and/or the length of the wire which is in contact with the inlet pipe may be chosen depending on the heat load required to liquefy the lubricant. The required heat load may depend on several factors, including the type of lubricant, how quickly the lubricant should be liquefied, the material from which the inlet pipe is made, the diameter of the inlet pipe and the thickness of the inlet pipe wall, the speed at which the congealed lubricant is pumped through the inlet pipe, the expected ambient temperature, and the degree to which the heater is insulated.

The heater may comprise an insulative outer layer. The insulative outer layer may comprise a removable sleeve allowing access to the resistive wire when the outer layer is removed. The insulative outer layer may comprise expanding foam which is sprayed around the resistive wire.

The lubrication circuit may comprise a controller operable to receive the measured parameter from the sensor and to turn the heater on or off depending on the measured parameter.

The controller may be configured to turn the heater on when the measured parameter crosses a first threshold.

The controller may be configured to turn the heater off when the measured parameter crosses a second threshold or when the measured temperature remains across the second threshold for a predetermined period of time.

The heater may comprise the controller of the lubrication circuit, i.e. the controller may be a part of the heater.

The heater may comprise the sensor of the lubrication circuit, i.e. the sensor may be a part of the heater.

The sensor may comprise a temperature sensor operable to measure the temperature of the lubricant.

The temperature measurement may be a direct measurement of the temperature of the lubricant or may be an indirect measurement where a temperature related to the temperature of the lubricant is measured instead (for example, the temperature of the outer wall of the inlet pipe or the ambient temperature), with the temperature of the lubricant being determined from the indirect measurement.

The temperature sensor may be a thermistor or a thermocouple or a platinum resistance thermometer, for example.

The temperature sensor may be provided within the inlet pipe. Alternatively, the temperature sensor may be provided outside of the inlet pipe, optionally in contact with an outer surface of the inlet pipe.

The controller may be operable to receive the measured temperature from the temperature sensor and to turn the heater on or off depending on the measured temperature.

Where an indirect measurement of the temperature of the lubricant is made, the controller may determine the temperature of the lubricant from the indirect measurement. This may be done using a look-up table or an equation relating the indirect measurement of the temperature to the temperature of the lubricant, for example. The look-up table or equation may be stored by the controller.

The temperature sensor may measure the temperature of the lubricant continuously, or may measure the temperature at periodic intervals, for example, every 1 second, every 2 seconds, every 5 seconds, every 10 seconds, every 30 seconds or every minute.

The controller may be configured to turn the heater on when the measured temperature is below a lower threshold temperature $T_{min}$. $T_{min}$ may be in the range of −60° C. to −20° C., for example about −40° C. $T_{min}$ may be chosen dependent on the lubricant used.

The controller may be configured to turn the heater off when the measured temperature reaches an upper threshold temperature $T_{max}$. $T_{min}$ may be in the range of −20° C. to 10° C., for example about −10° C. $T_{max}$ may be chosen dependent on the lubricant used.

The controller may be configured to turn the heater off when the measured temperature is above the upper threshold temperature $T_{max}$ for a predetermined period of time. The predetermined period of time may be between 30 seconds and 5 minutes, for example between 1 and 2 minutes.

The sensor may comprise a viscosity meter for measuring the viscosity of the lubricant. The viscosity meter may be provided within the inlet pipe.

The controller may be operable to receive the measured viscosity from the viscosity meter and to turn the heater on or off depending on the measured viscosity.

The viscosity meter may measure the viscosity of the lubricant continuously, or may measure the viscosity at periodic intervals, for example, every 1 second, every 2 seconds, every 5 seconds, every 10 seconds, every 30 seconds or every minute.

The controller may be configured to turn the heater on when the measured absolute viscosity is above an upper threshold viscosity $V_{max}$. $V_{max}$ may be in the range of 4 kg/ms to 6 kg/ms, and is for example 5 kg/ms.

The controller may be configured to turn the heater off when the measured absolute viscosity reaches a lower threshold viscosity $V_{min}$. $V_{min}$ may be in the range of 0.05 to 0.15 kg/ms.

The controller may be configured to turn the heater off when the measured viscosity is below the lower threshold viscosity $V_{min}$ for a predetermined period of time. The predetermined period of time may be between 30 seconds and 5 minutes, for example between 1 and 2 minutes.

The sensor may comprise a density meter for measuring the density of the lubricant. The density meter may be provided within the inlet pipe.

The controller may be operable to receive the measured density from the density meter and to turn the heater on or off depending on the measured density.

The density meter may measure the density of the lubricant continuously, or may measure the density at periodic intervals, for example, every 1 second, every 2 seconds, every 5 seconds, every 10 seconds, every 30 seconds or every minute.

The controller may be configured to turn the heater on when the measured density is above an upper threshold density $\rho_{max}$. $\rho_{max}$ may be chosen dependent on the lubricant used.

The controller may be configured to turn the heater off when the measured density reaches a lower threshold density $\rho_{min}$. $\rho_{min}$ may be chosen dependent on the lubricant used.

The controller may be configured to turn the heater off when the measured density is below the lower threshold density $\rho_{min}$ for a predetermined period of time. The predetermined period of time may be between 30 seconds and 5 minutes, for example between 1 and 2 minutes.

The heat exchanger may be a lubricant cooler. A flow of cooling fluid may be passed through the heat exchanger to cool the oil. The cooling fluid may be water, another oil stream, air, or fuel, for example.

The lubricant circuit may comprise a lubricant gallery. The lubricant circuit may comprise a pump. Lubricant in the lubricant circuit may flow from the pump, through the heat exchanger, through the lubricant gallery and then back to the pump.

The lubricant may be oil, and in particular may be PRF-23699.

The present disclosure also extends to a gas turbine engine comprising a lubrication circuit as described above. The gas turbine engine may comprise a gearbox, and the lubrication circuit may be for lubricating the gearbox.

The gas turbine engine may comprise an on-engine generator or a connection to a ground power unit, operable to power the heater.

The heat exchanger in the lubrication circuit in the gas turbine engine may be an oil cooler. The lubricant cooler may exchange heat between oil and fuel, to cool the oil and pre-heat the fuel before injection into the engine, thereby improving engine performance.

BRIEF DESCRIPTION OF DRAWINGS

A non-limiting example will now be described, with reference to the accompanying drawings, in which:

FIG. 1 shows a heat exchanger (an oil cooler) 20 in a prior art lubrication circuit. The oil cooler 20 receives a pumped flow of lubricant 10a through an inlet pipe 10. When the system is cold (for example, at start-up) the lubricant 10a is cold, to the extent that it has congealed or solidified. In that case, forcing the lubricant 10a into the inlet heater 22 and heat exchange matrix 24 of the heat exchanger 20 is very difficult. The pressure in the system will be so high that the pressure drop across a pressure relief valve 28 in a bypass gallery 26 (which circumvents the heat exchange matrix 24) will be sufficient to open the pressure relief valve 28, allowing the lubricant to pass through the bypass gallery 26. Over time the pressure relief valve 28 will wear and may need to be replaced.

Figure 1:
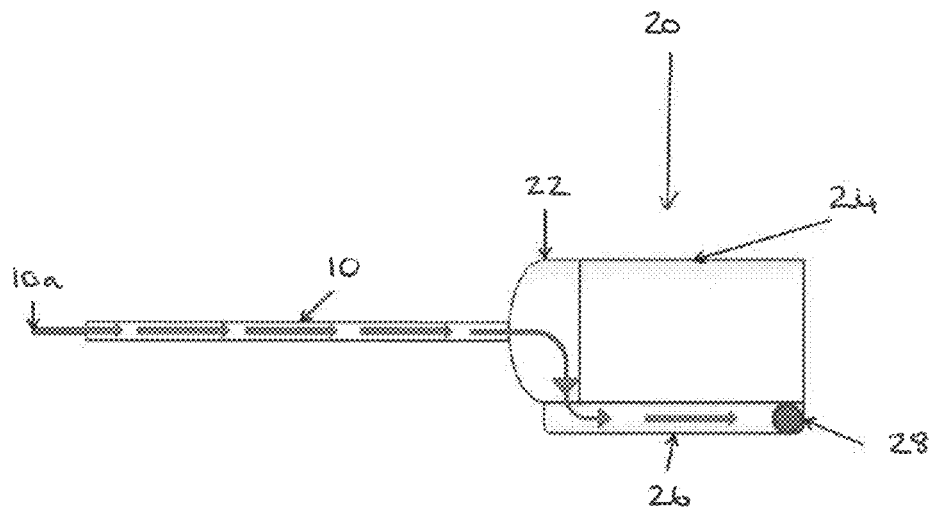
FIG. 1 shows an oil cooler of a prior art lubricant circuit.
Figure 2:
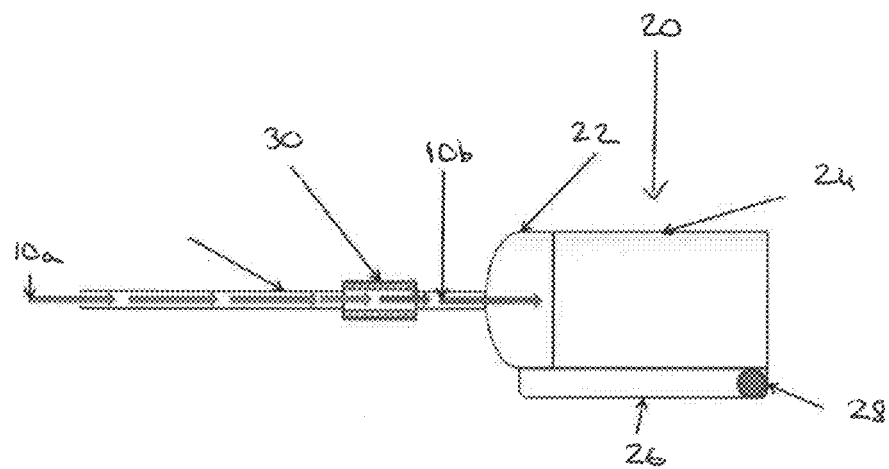
FIG. 2 shows an exemplary oil cooler of a lubricant circuit according to the present disclosure.

According to the present disclosure, an electrical heater 30 is provided upstream of the oil cooler 20 (see FIG. 2). The heater 30 heats the oil prior 10a to it reaching the oil cooler, such that the oil 10b is liquefied by the time it reaches the oil cooler 20. The oil is heated to the extent that it is sufficiently viscous to be able to flow into the inlet header 22 of the oil cooler 20 and into the heat exchange matrix 24. The pressure relive valve 28 in the bypass gallery 26 need not be actuated, thereby prolonging its life.

Figure 3A:
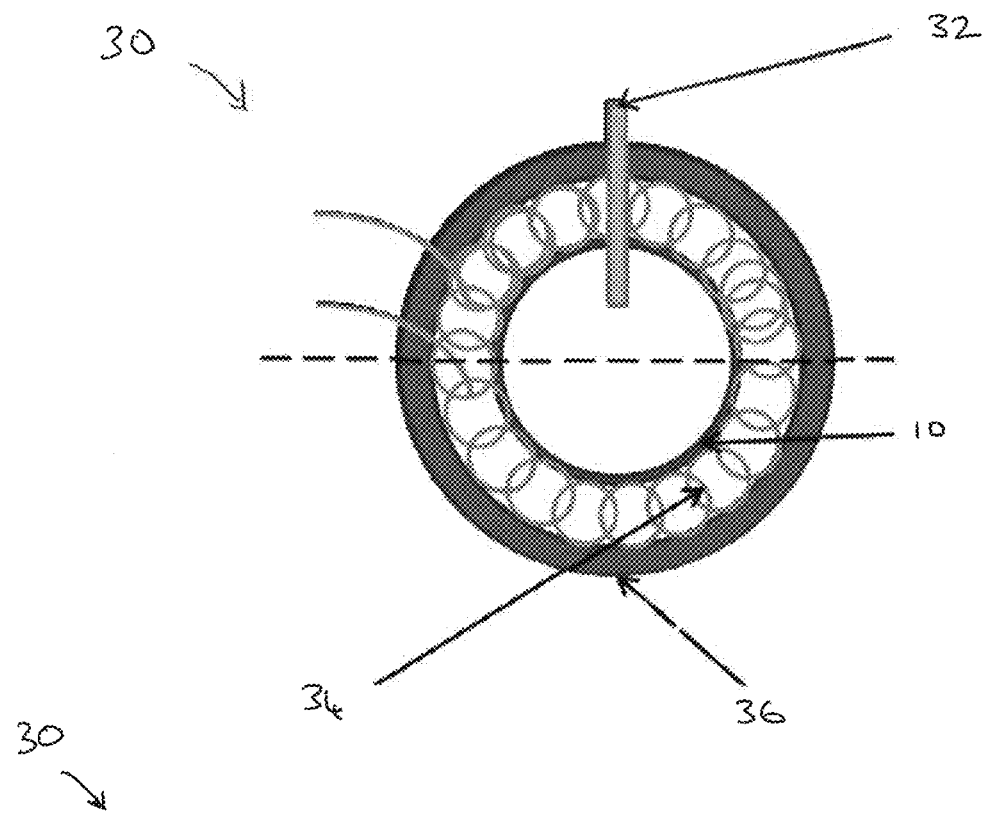
FIGS. 3a and 3b show cross sections through an exemplary lubricant heater according to the present disclosure.
Figure 3B:
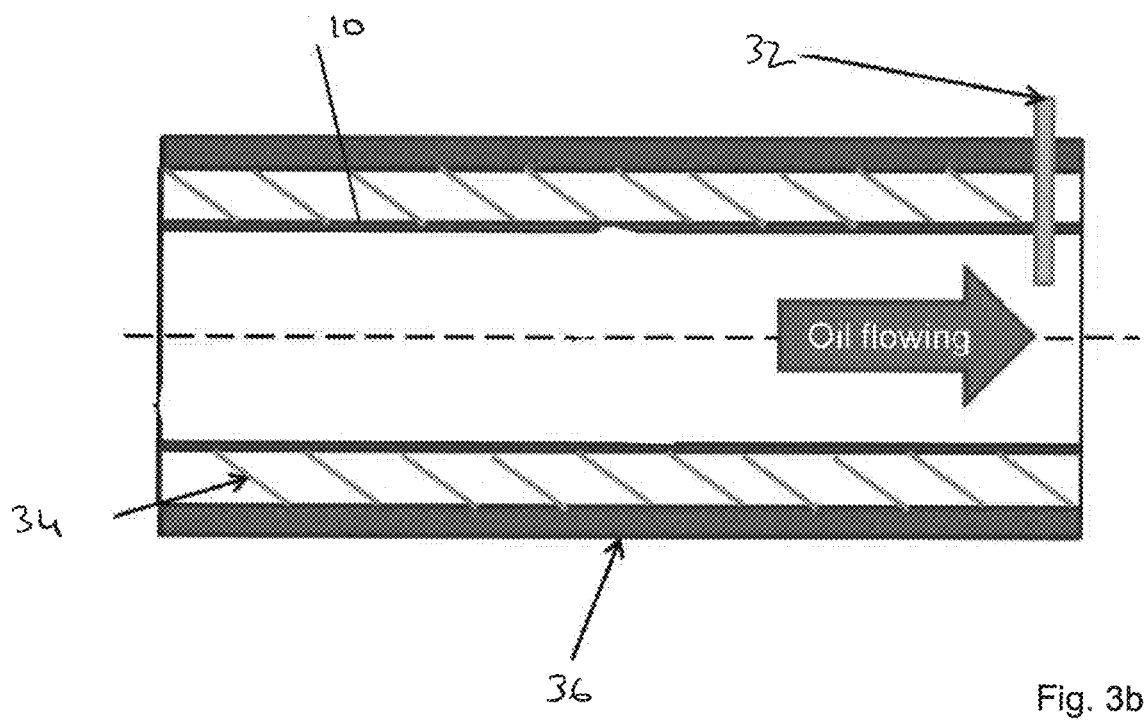

The structure of the heater 30 is shown in FIGS. 3a and 3b, which show cross-sections through the inlet pipe 10 and the heater 30. The heater 30 comprises a coil of resistive wire 34 wound around the inlet pipe 10. The coil of resistive wire 34 is in contact on one side with the outer surface of the inlet pipe 10 and is insulated on the other side by an insulative sleeve 36. The insulative sleeve 36 in this case is a foam sleeve, which can be removed to access the coiled wire 34.

The heater 30 comprises at least one of a thermocouple, thermistor, platinum resistance thermometer, or other temperature sensing device 32 (in this example a thermocouple 32 is used) which is disposed inside the inlet pipe 10 to measure directly the temperature of the lubricant 10a.

During design of the electrical heater 30, appropriate values for the resistivity of the wire 34 and/or the length of the wire 34 which is in contact with the inlet pipe 10 are selected, depending on the heat load required to liquefy the lubricant. The required heat load may depend on several factors, including the type of lubricant 10a, how quickly the lubricant should be liquefied, the material from which the inlet pipe 10 is made, the diameter of the inlet pipe 10 and the thickness of the inlet pipe 10 wall, the speed at which the congealed lubricant 10a is pumped through the inlet pipe 10, the expected ambient temperature, and the degree to which the heater 30 is insulated by the insulative sleeve 36.

Figure 4:
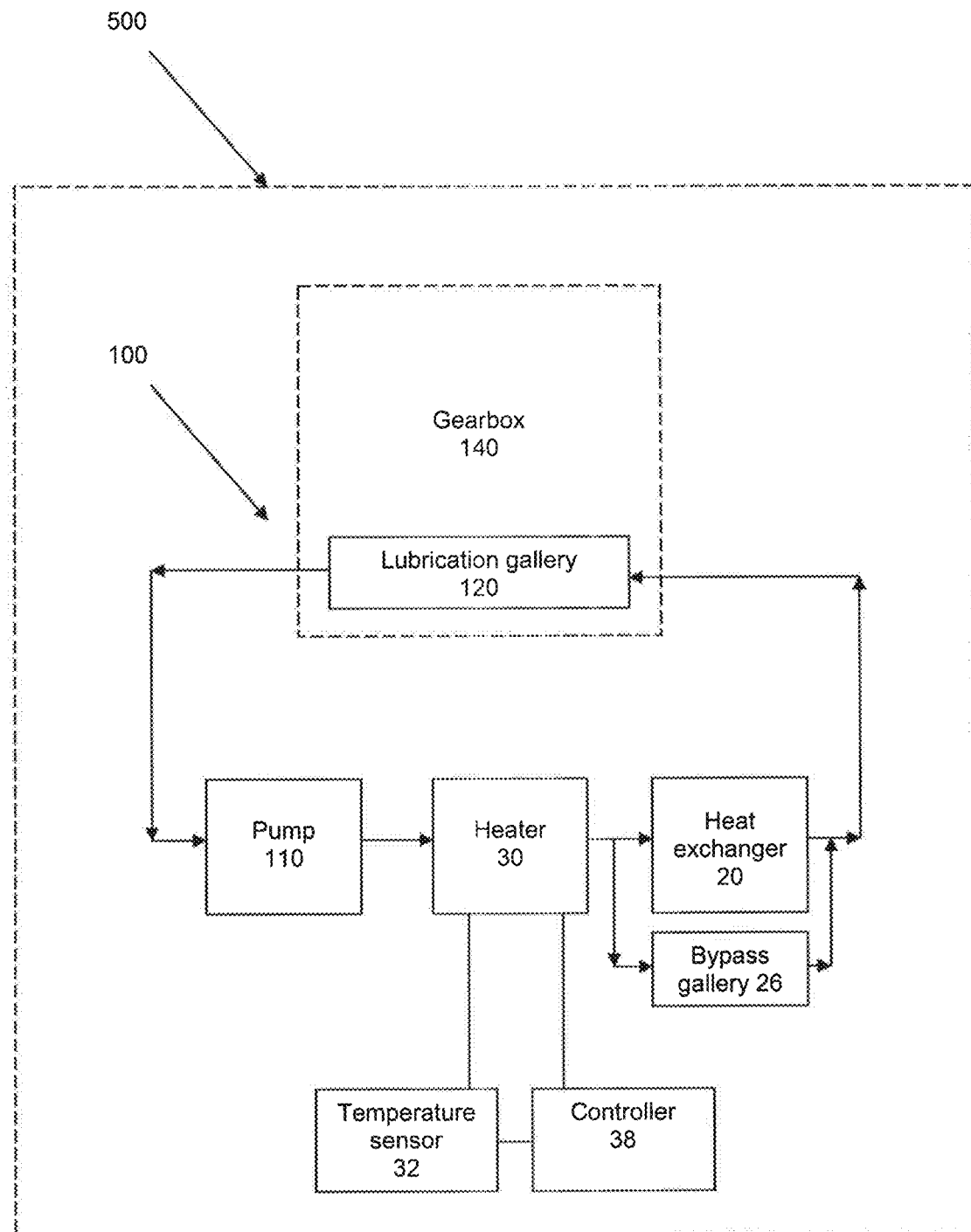
FIG. 4 shows an exemplary lubrication circuit in a gas turbine engine according to the present disclosure.
Figure 5:
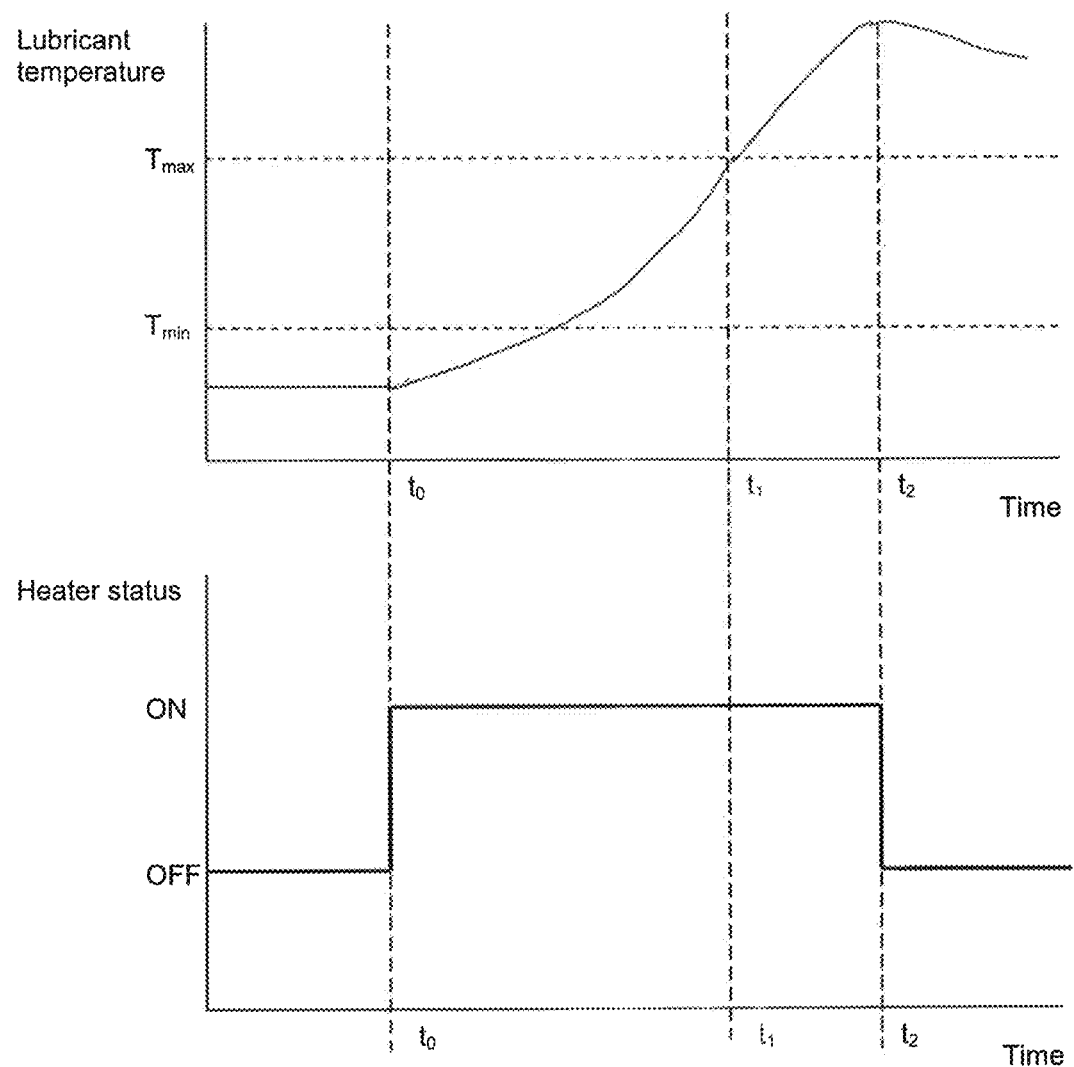
FIG. 5 shows an exemplary operation scheme of the heater, dependent on the temperature of the oil.

As shown in FIG. 4, the thermocouple 32 is in communication with a controller 38 which is operable to receive the measured temperature from the thermocouple 32 and to turn the heater 30 on or off depending on the measured temperature. The controller 38 is configured to turn the heater 30 on when the measured temperature is below a lower threshold temperature $T_{min}$ of about −50° C. (see FIG. 5). The controller 38 is configured to turn the heater off when the measured temperature reaches an upper threshold temperature $T_{max}$ of about −10° C. and stays above that temperature for 2 minutes. This is shown in FIG. 5. The thermocouple 32 measures the temperature at to and the controller 38 recognises that the temperature is below $T_{min}$. The heater 30 is therefore turned on by the controller 38. The thermocouple 32 measures the temperature every minute, and recognises the temperature is above $T_{max}$ at $t_1$. The temperature remains above $T_{max}$ for a further two minutes, at which time the heater 30 is turned off, at time $t_2$.

FIG. 4 shows a lubricant circuit 100 in a gas turbine engine 500. A pump 110 pumps lubricant to an oil cooler 20, passing through a pipe which is heated by heater 30, to liquefy any congealed/solidified oil. The heater 30 is powered by an on-engine generator in the gas turbine engine 500. In the oil cooler 20, a flow of cooling fuel is passed through the heat exchanger matrix 24 to cool the oil 10b and pre-heat the fuel before injection into the engine, thereby improving engine performance. After passing through the oil cooler 20 the oil 10b flows into a lubrication gallery 120 in a gearbox 140 to cool and lubricate components in the gearbox 140. The oil then returns to the pump 110.

The invention claimed is:

1. A gas turbine engine comprising:
  a gearbox; and
  a lubrication circuit for lubricating the gear box, the lubrication circuit comprising:
  a heat exchanger comprising a bypass gallery having a pressure relief valve which allows lubricant to flow into the bypass gallery if a pressure of the lubricant at the pressure relief valve is above a predetermined value;
  an inlet pipe which carries lubricant to the heat exchanger;
  a heater configured to heat lubricant in the inlet pipe prior to its introduction to the heat exchanger;
  a sensor operable to measure a measured parameter from which it can be determined whether the lubricant requires heating, wherein the sensor is positioned in or on the inlet pipe, immediately upstream of the heat exchanger; and
  a controller operable to receive the measured parameter from the sensor and to turn the heater on or off depending on the measured parameter.

2. The gas turbine engine of claim 1, wherein the controller is configured to turn the heater on when the measured parameter crosses a first threshold.

3. The gas turbine engine of claim 1, wherein the controller is configured to turn the heater off when the measured parameter crosses a second threshold or when the measured temperature remains across the second threshold for a predetermined period of time.

4. The gas turbine engine of claim 1, wherein the sensor is a temperature sensor operable to measure the temperature of the lubricant.

5. The gas turbine engine of claim 4, wherein the temperature sensor is provided within the inlet pipe.

6. The gas turbine engine of claim 4, wherein the temperature sensor is provided outside of the inlet pipe in contact with an outer surface of the inlet pipe.

7. The gas turbine engine of claim 1, wherein the sensor is a density meter or a viscosity meter, and wherein the sensor is provided within the inlet pipe.

8. The gas turbine engine of claim 1, wherein the heater is an electrical heater.

9. The gas turbine engine of claim 1, wherein the heater comprises a resistive wire in contact with the inlet pipe, optionally wherein the heater comprises a coil of wire wound around the inlet pipe.

10. The gas turbine engine of claim 1, wherein the heater comprises an insulative outer layer.

11. The gas turbine engine of claim 1, wherein the heat exchanger is a lubricant cooler.

12. The gas turbine engine of claim 1, further comprising:
  an on-engine generator or a connection to a ground power unit operable to power the heater.

\* \* \* \* \*